United States Patent
Evans et al.

[11] Patent Number: 5,922,977
[45] Date of Patent: Jul. 13, 1999

[54] METHOD AND APPARATUS FOR DETECTING A SOFT FOOT CONDITION OF AT LEAST ONE MACHINE AND FOR CORRECTION THEREOF

[75] Inventors: Galen Evans, Pembroke Pines, Fla.; Martin Wegener, Kirchheim, Germany

[73] Assignee: Pruftechnik Dieter Busch AG, Ismaning, Germany

[21] Appl. No.: 08/938,750

[22] Filed: Sep. 26, 1997

[51] Int. Cl.⁶ .................................................. G01M 19/00
[52] U.S. Cl. .......................................... 73/865.8; 364/506
[58] Field of Search ............................... 73/865.9, 865.8; 364/506

[56] References Cited

U.S. PATENT DOCUMENTS

| | | | |
|---|---|---|---|
| 4,463,438 | 7/1984 | Zatezalo et al. | 364/709 |
| 4,623,979 | 11/1986 | Zatezalo et al. | 364/709 |
| 5,115,406 | 5/1992 | Zatezalo et al. | 364/709.11 |
| 5,621,655 | 4/1997 | Nower et al. | 364/506 |

OTHER PUBLICATIONS

Advanced Diagnosis & Correction Of Soft Foot, How To Detect Machine Frame Strains: Soft Foot, Ludeca, Inc., 1990, pp. 74–82.

Precision Maintenance May Be Best Approach For Many Mills, Pulp & Paper, Jan. 1997, pp. 103–108.

Stephen Case et al., Taking Control Of Maintenance Costs Through Training, Industrial Engineering, Oct. 1993, pp. 36–37.

E.S. "Steve" Darby, Managing Motors=Maximizing Motors, Easa Service Centers: Sales, Service, Support, p. 14.

Soft Foot Causes, Characteristics, And Solutions, Ludeca, Inc., 1994, pp. 1–21.

W.F. Teskey et al., Defromation, Alignment, And Vibration In Large Turbine–Generator Set, Journal Of Surveying Engineering, May 1996, pp. 64–77.

*Primary Examiner*—Max H. Noori
*Attorney, Agent, or Firm*—Sixbey, Friedman, Leedom & Ferguson; David S. Safran

[57] ABSTRACT

A system and method for detecting a soft foot condition of one or more machines. Several measurements of a soft foot condition of a machine to be tested are made and the numerical output of the measuring device is stored in a memory of the device of the present invention. This information is used to systematically diagnose (or assist in diagnosing) possible causes of such soft foot condition and to provide general or numerical advice on possible corrective action. Such advice will be systematically derived by a computer and will relate to remedies considered to be most effective or important, and will be provided to the operator of such instrument either by a readout on a screen or a display of an instrument employed for this purpose.

4 Claims, 5 Drawing Sheets

FIG. 1A
(PRIOR ART)
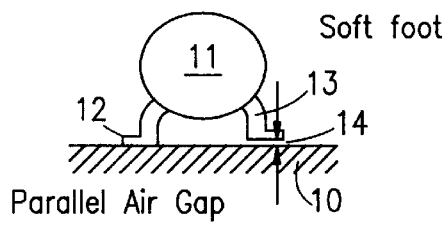
Soft foot — Parallel Air Gap
FIG. 1B
(PRIOR ART)
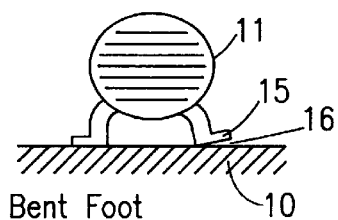
Bent Foot
FIG. 1C
(PRIOR ART)
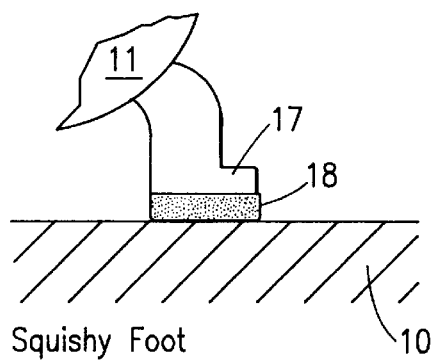
Squishy Foot
FIG. 1D
(PRIOR ART)
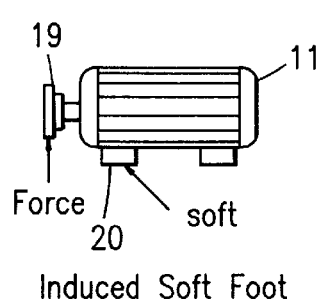
Induced Soft Foot
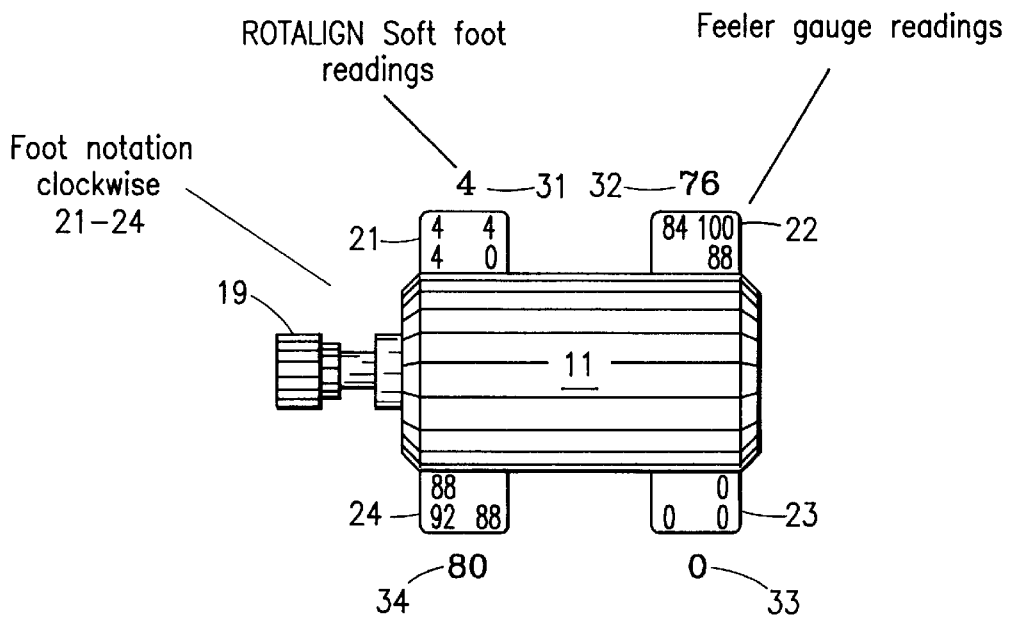
FIG. 2

METHOD AND APPARATUS FOR DETECTING A SOFT FOOT CONDITION OF AT LEAST ONE MACHINE AND FOR CORRECTION THEREOF

BACKGROUND OF THE INVENTION

The present invention relates to a method and apparatus for detecting a soft foot condition of one or more machines. The term "soft foot," as used throughout this text, relates to the usage as is common among engineers, technicians etc., and is not directly related to the usage of the same term, as used in the medical or related arts. For those persons not acquainted with this term it should be explained that normally nothing is "soft" with the feet under inspection. To the contrary, the feet are quite inelastic. However, once the feet tie a machine under test to the ground in a sturdy fashion, then the geometric constraints of the feet and/or shop floor ground will cause small, but intolerable mechanical deformation or distortion of such specific machine.

It has long been recognized that setting up and installing rotating equipment and machinery requires careful layout and care in the installation. This is especially true for equipment of some size, which despite of its weight and apparent stable construction, nonetheless requires attention to maintain mechanical dimensionality within predefined tolerances, which may correspond to minute fractions of an inch or may be in the sub-millimeter range. Neglecting such prerequisites will yield slightly, but definitely distorted, machine dimensions and thus will frequently cause reduced service life. Also, suboptimum output or efficiency may result from such machines, which may be combustion engines, electric motors or generators, turbines, lathes or other machine tools, pumps, ventilators (fans), gearboxes, and many more machines of the like.

As is well known, installing and mounting such machines on uneven or rough surfaces will result in a somewhat distorted shape of their housings or enclosures, with subsequent adverse effects on the bearings for shafts, spindles or the like present in such machines. Another negative effect is in obtaining and maintaining correct alignment of the spindles of machine trains such as, for example, pumps and their driving motors. In electric motors or generators, deformation of the machine induced by inadequate mounting may have effects on the shape of the magnetic airgaps, usually reducing output power, efficiency, or both with such machinery.

There have been investigations that demonstrate the economic impact of badly mounted or aligned machine trains, in addition to the power losses. Machines in the 10 hp range may require additional maintenance cost in the range of more than U.S. $400 per horsepower per year. The importance of machines positioned correctly and aligned to stringent levels should be understood by all levels of management involved. However, considering quality terms for such machinery became more frequent just recently. An analysis of the technical aspects of the soft foot condition carried out by the present applicants discovered that contrary to common consideration, determination of the causes of a soft foot condition and advising on corrective measures are not systematically carried out. One reason for this is that there is not only one "soft foot" situation, but several classes of such, which require different corrective handling. Thus, it still may be possible for an engineer trying to eliminate a soft foot condition on a machine, to perform just the opposite and worsen conditions because of a lack of understanding or proper guidance on how to proceed to eliminate such adverse constraints on the machine.

SUMMARY OF THE INVENTION

It is therefore an object of the present invention to give the persons involved in the art access to an instrument that employs useful and specific methods not only to diagnose a soft foot condition, but discern different types of such condition and provide automated and reasoned information on how to eliminate such a condition in the least time possible.

The invention is based on the principles and the measurement capabilities of a laser alignment instrument, but is not limited to using an instrument of this specific type. Measuring equipment of the laser alignment type is already able to generally indicate a soft foot condition on a machine train. At least, the Optalign and the Rotalign systems of German manufacturer Pruftechnik are able to carry out such measurements. However, only numeric values informing about the magnitude of a soft foot condition are indicated, without providing any information on how to resolve such condition. According to the present invention, it is possible to perform several measurements on the soft foot condition and then utilize the numerical output of the measuring device to systematically diagnose (or assist in diagnosing) possible causes of such encountered condition and to provide general or numerical advice on possible corrective action. Such advice will be systematically derived by a computer and will relate to remedies considered to be most effective or important, and will be provided to the operator of such instrument either by a readout (i.e. alphanumeric information or pictograms) on a screen or a display of an instrument employed for this purpose. In another embodiment, such instrument will have an acoustical output, i.e. will provide information in a common language. With acoustical output, it may be of additional benefit to also have an acoustic input, employing direct speech input via a microphone to a computer, in order to implement an additional channel of inputting information or commands to such instrument. It is preferred, to have such instruments be of the portable type.

According to the present invention, several measurements regarding a soft foot condition will be carried out on a machine to be tested. This is done in a manner as already known—e.g. loosening screws or nuts that normally clamp down the feet of the machine to the shop floor. One after another of such nuts or screws will be loosened on the machine under test, and the relating deviation of the contacting surface of a specific foot in relation to an ideal plane, if any, will be indicated as a numerical value and registered in a memory of the device of the present invention. Specific to the invention, and depending on the magnitude and geometrical distribution of such registered values, the instrument will proceed according to the method of analysis of the invention to finally suggest the most feasible corrective action, or give ranked information on such useful actions, in case several seem appropriate. As indicated above, such suggestion can be presented to the user of the device via a display, a screen, an acoustical output, singly or in combination.

The preferred way to utilize the invention is depicted in the drawings, and a preferred method to utilize the invention will be demonstrated in the following description.

BRIEF DESCRIPTION OF THE DRAWINGS

FIGS. 1A, 1B, 1C and 1D illustrate a symbolic representation of different types of soft foot conditions, as caused by different mechanical defects;

FIG. 2 illustrates a preferred kind of enumeration of machine feet, for a single machine, also indicating numerical values as registered for soft foot condition as well as numerical values of supplemental information, registered manually with feeler gages on individual feet on a machine under test;

DETAILED DESCRIPTION OF THE PREFERRED EMBODIMENTS

Figure 3A:
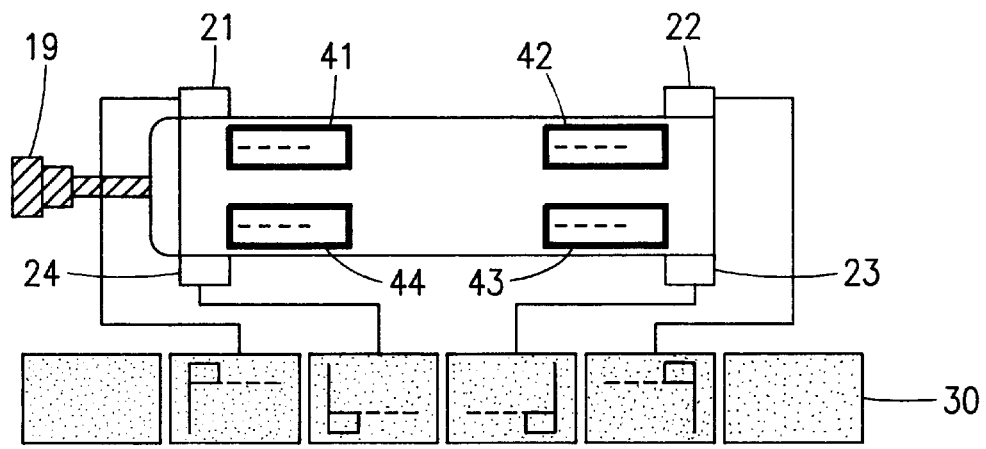
FIG. 3A illustrates a display of the machine according to the invention, used for guiding an operator when inputting data manually.

As shown in FIG. 1A, several mechanical defects are known that will cause a soft foot condition. A piece of rotating equipment 11, such as a machine tool or the like, may be fastened by its four feet to a shop floor 10. Of the feet 12 and 13 shown in FIG. 1A, a parallel air gap is present under foot 13. Upon clamping or tying foot 13 to the ground, this air gap may be eliminated, and the machine housing may be distorted creating a typical soft foot condition. A similar condition is shown in FIG. 1B. Instead of a parallel air gap, a slanted air gap 16 is present under the inclined bottom surface of bent foot 15. Clamping down foot 15 to the ground 10 will give rise to a soft foot condition with a distorted machine housing or casing as well. Another situation of similar kind is depicted in FIG. 1C, indicating what is also called a "squishy foot" condition, which is caused by shims 18 of inadequate quality, or foreign matter between foot 17 and the floor or ground 10. A further situation of a similar kind is depicted in FIG. 1D, indicating what is called an "induced soft foot" condition, which is attributable to a distortion of the machine housing 11 induced by an external load or force, which, for example, may be induced via a coupling flange 19 that is used to connect two (misaligned) shafts.

Similar to FIGS. 1A–1D, FIG. 2 shows a top view of a piece of machinery with a rotatable shaft, spindle or the like. In order to distinguish between individual feet of the machine, reference numerals 21–24 are shown, above or below which are indicated calculated soft foot values. Such calculations of soft foot values are obtained by first obtaining alignment values of a machine train with all its basic fastening elements strapped down to the shop floor, then loosening such fastening elements singly and one after another, in an ordered fashion, and taking alignment measurements on the machine in a regular procedure. In FIG. 2, on each single foot 21–24, additional numerical values are shown that represent the values of clearances, measured manually with a feeler gage, with the basic fastening element of that specific machine foot loosened.

Figure 3B:
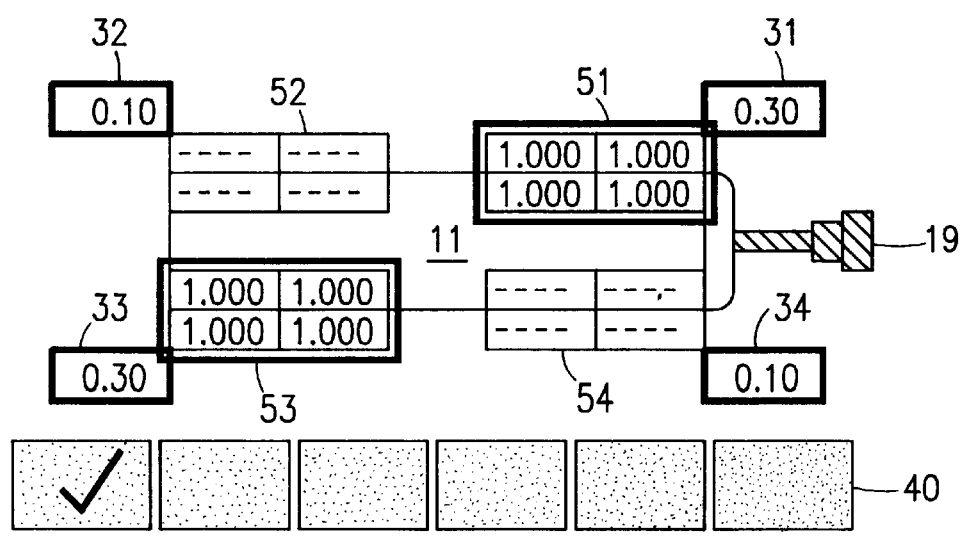
FIG. 3B illustrates a display of the machine according to the invention, used for outputting values which were furnished to the device.

As shown in FIGS. 3A and 3B, the apparatus according to the invention may comprise softkeys 30 for inputting or editing clearances that are observed under specific feet, as symbolized by reference numerals 21–24, 24, on a symbolized machine, the direction of which is symbolized by an indication of a coupling flange 19. It is possible to enter several values for each foot, that relate to measured clearances under a specific foot of a machine in case the related fastening element has been completely loosened or removed. Reference numerals 41–43 indicate input fields for such measured values, that are on the inboard side of the machine. By activating one of the softkeys 30 it is possible to select input fields for entering measured values on the outboard side of each single foot.

Referring to FIG. 3B, once all measured values have been entered, the device, in a first step in accordance with the method of the present invention will display values as entered in fields 51–54, as well as calculated values indicating the magnitude of the soft foot condition for each foot of the machine, as depicted in fields 31–34. Softkey-line 40 is available for entering further commands or for performing further editing.

One of the most important commands as mentioned above will be the systematic evaluation of such numerical values displayed on the display and simultaneously present in the memory of the device according to the invention, in order to perform a machine assisted evaluation on the most likely underlying cause of a noticed soft foot condition.

Figure 4A:
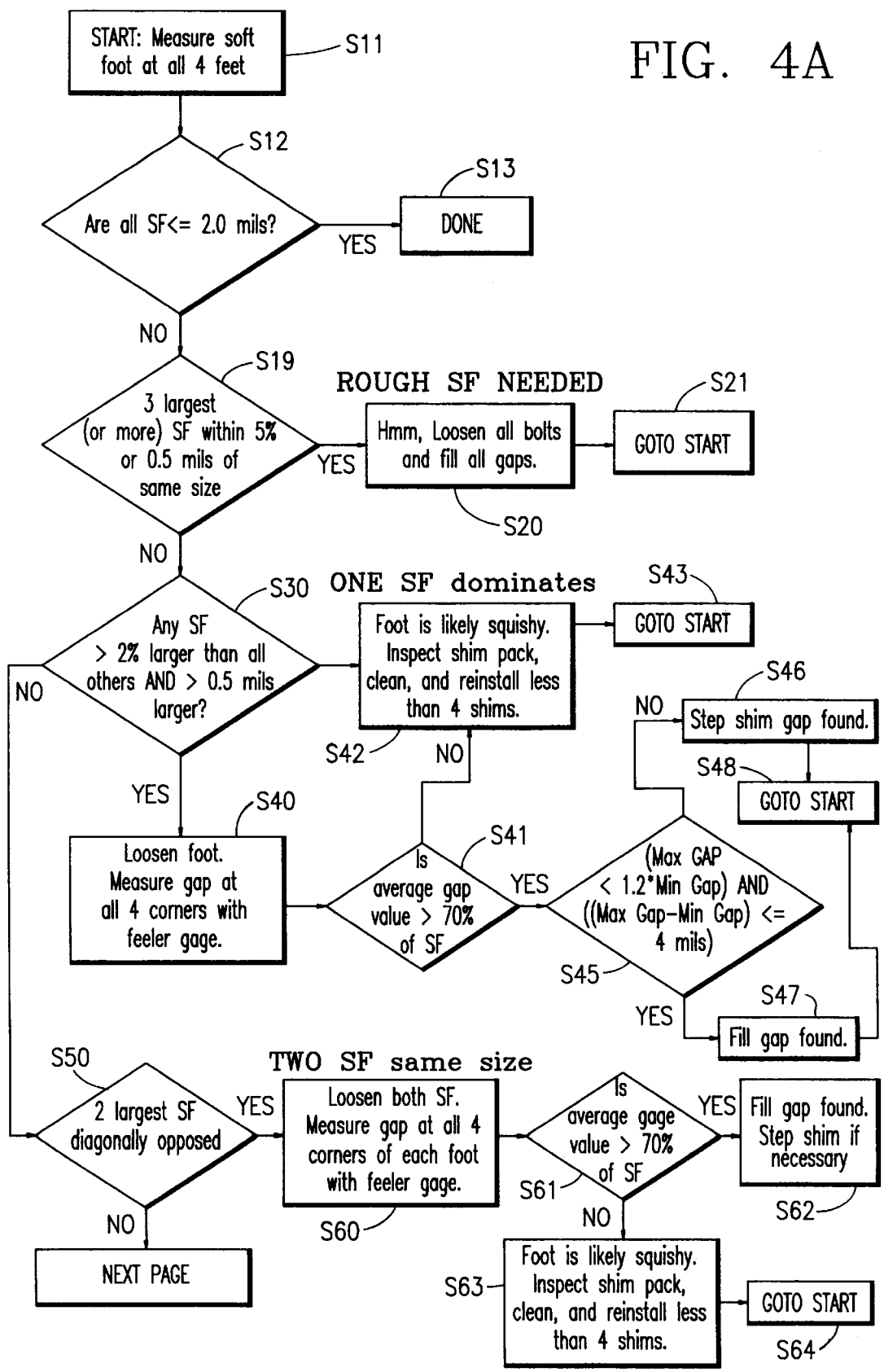
FIGS. 4A and 4B illustrate a flowchart identifying single phases of decisions upon which the analysis and suggested corrective actions on soft foot condition of a machine are based.
Figure 4B:
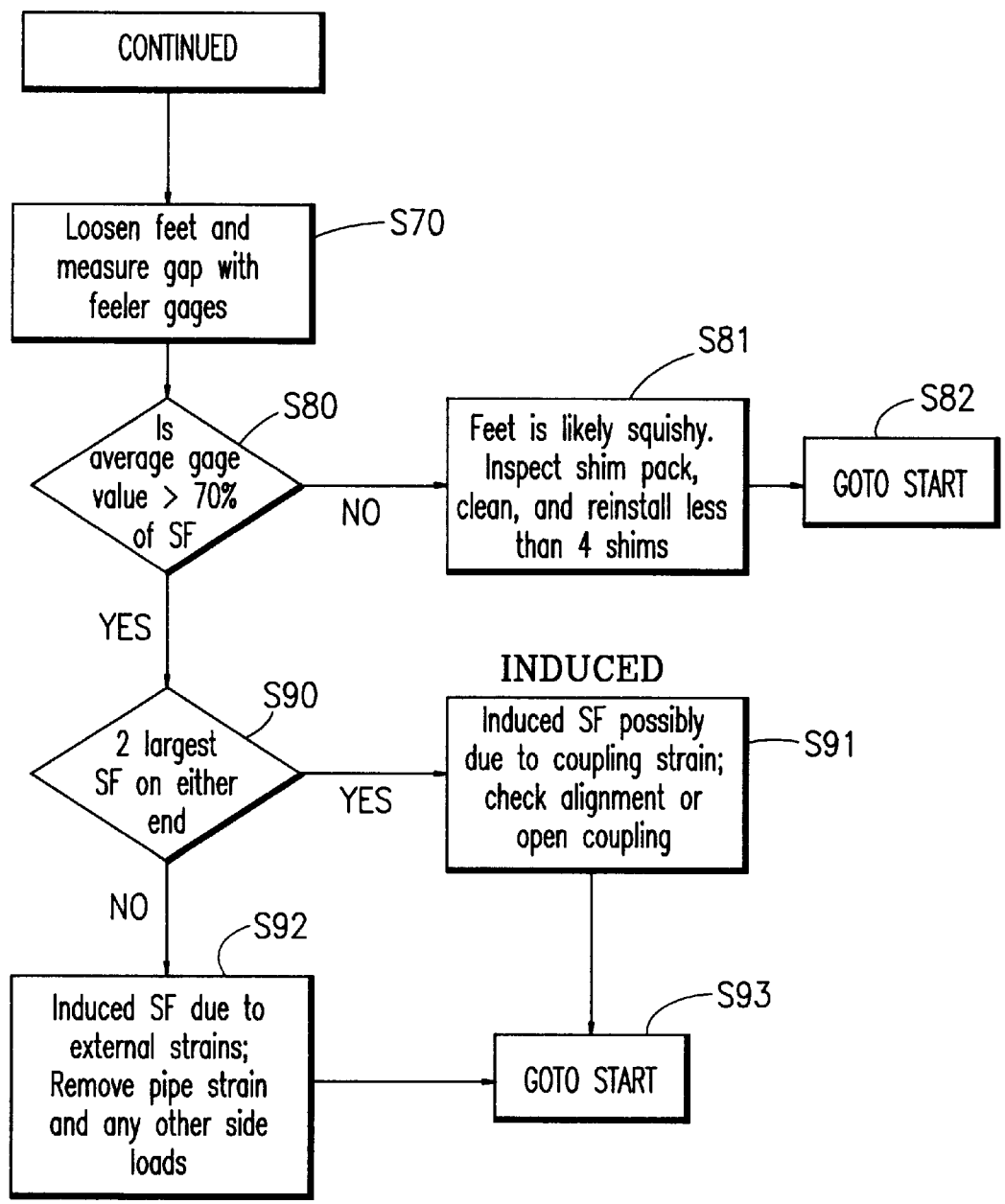

As depicted in FIG. 4A, in a first step S11 according to the method of the invention, a conventional measurement with subsequent calculation of soft foot condition is performed on all four feet of a machine under test, preferably using a laser based aligning instrument. The calculated values of the soft foot condition will be kept in the memory of the device.

Step S11 being completed, the next step to be performed is S12, in which the results of step S11 will be evaluated. If all soft foot conditions are calculated to be less than $2/1000$ of an inch (2.0 mils), the procedure will branch to step S13. With all values within predefined limits, there is no soft foot condition to correct, and after signaling such information to the operator by means of the display of the device according to the invention, the routine may terminate, preferably after having logged all relevant data in the memory of the device or in a host computer optionally connected by signal transmitting means to such device. It is also possible to employ acoustical signaling means to indicate that no further actions are necessary.

If at least one soft foot condition is calculated to be larger than 2.0 mils, the process continues with step S19, in which it is decided whether or not the three largest calculated soft feet conditions are of comparable magnitude, i.e. do not exceed an upper or lower boundary relative to their mean value (arithmetic mean, for example), which boundary will not differ by more than 5% of that mean value, or by more than $5/10000$ of an inch (0.5 mils) absolute value compared to that mean value. It will be appreciated, that it is advantageous to have such task carried out by a computer, rather than manually. If the mentioned three largest values do stay within the specified boundaries, step S20 will be performed, in which a message is forwarded to the operator to loosen all bolts or primary fasteners on the machine under test and fill all visible gaps under the feet of the machine, maybe additionally checking on the local sturdiness of the floor. Step S20 generally relates to the condition, or activity, that is called rough soft foot. This is a millwright procedure by which the machine base bolts are loosened, and efforts are carried out to have each foot of the machine support the same load, or the correct proportion of the load, as well as to have each foot in full co-planar contact with its shim pad, i.e. with even loading over the area under each foot. Step S20 being completed, the process will continue with step S21 and prompt the operator to return to step S11 (start) or will automatically do so by itself, so that the soft foot evaluation on all four feet can be carried out again.

If the three largest values do not stay within the specified boundaries in step S19, step S30 will be performed, in which it is determined whether or not at least one soft foot condition has been calculated to be 2% larger than all others and, in an absolute value, simultaneously be 5/10000 of an inch (0.5 mils) larger than all others calculated. It will again be appreciated, that it is advantageous to have such task carried out by a computer, rather than manually. If a positive determination is made in step S30, i.e. the "larger" condition was determined, the process will branch to perform step S40. In this step the operator will be notified to loosen a specific foot, according to what has been calculated by the instrument, and to measure the dimension of the gap below that foot, at all four corners of the foot. It may suffice to measure the apparent gap at only three corners, which are the easiest to access. The measurement may be carried out manually. It also may be carried out using gauges with an electronic output, connected to the device according to the invention. After all required values for a specific single gap have been entered into the device, step S41 will be performed. In step S41 the device will decide, based upon a prior calculation performed by the device, whether or not the average measured gap value has been determined to be greater than 70% of the formerly calculated, numerical value of the soft foot condition. Upon this decision, either step S42 or S45 will be carried out automatically. Step S42 relates to the negative outcome, if the average gap value is greater than 70% of the calculated soft foot condition. In this step of the inventive method, the operator will be messaged, either acoustically or optically, that the foot currently under inspection is likely to be of the "squishy" type, possibly caused by foreign matter under the foot, or other circumstances that offer a higher mechanical compliance to the foot than intended or specified. A message may be displayed, in addition, to inspect a shim pack, if already present under the foot, and to clean it, if necessary, while taking care not to employ more than three shims simultaneously. Once the operator acknowledges the presented information within step S43, the process will return to step S11, where input values are obtained and numerical values are calculated for a predicted soft foot condition.

If the decision of step S41 is in the positive, the routine will branch to perform step S45. In step S45, numerical calculations and logical decisions are carried out to determine whether the following conditions are simultaneously true: a) if the maximal extension of a single gap is still smaller than 1.2 times the smallest extension determined under that specific foot, and b) if the difference between the extensions, represented by the term "max gap-min gap", is less than or equal to 4/1000 of an inch (4 mils, equivalent to about 0.1 millimeter, or 100 microns). If both conditions are true, the process will continue with step S47, signaling (or messaging) that the found gap requires filling, which should be done in a manner preferred in the art, i.e. shimming with high quality shims, with several shims being completely one above the other. In the other case, the process will continue with step S46, also signaling to eliminate the gap found, but by step shimming, as is also an accepted method in the art. On completion of either steps S46 or S47, the process will continue with step S48, which is a branch to step S11, in order to be ready for performing another machine assisted investigation of a soft foot condition.

If, on the other hand, the determination in step S30 is in the negative, step S50 will be performed. In this step, it is determined whether the two largest calculated soft foot predictions are diagonally opposite on the machine under test. If it is determined that they are diagonally opposite, the procedure will continue with step S60. This step relates to the situation where two calculated, or predicted, soft foot conditions are about the same size. During the performance of this step, the operator will be prompted to loosen both fastening elements (e.g. nuts) for the specific feet being tested. The operator will also be prompted to measure the specific dimensions of the gaps below those two feet, preferably at all four corners of each foot. The operator may do so using a feeler gage, or an instrument that will provide its readings in machine readable form, i.e. providing data in a data format that may be transmitted via a cable, or optically, or otherwise as is known in the art. Having furnished such requested readings to the device of the present invention, the process will continue with step S61 in order to perform calculations and determine whether the average gage value (for each foot measured) amounts to more than 70% of the predicted value of the soft foot condition. If the outcome of such investigation, as applied to a single foot of the two mentioned, is in the positive, then the process will continue with step S62, where the operator will be prompted to fill the gap found, or step shim such gap, if necessary, employing accepted methods of the art. If, alternatively, the outcome is in the negative, then the routine will branch to step S63, by which the operator is informed that a specific foot (of the two feet currently under test) is likely to be "squishy." The operator will also be informed or prompted to do the following: to inspect a shim pack, possibly present under such foot, to clean the gap and/or shim pack, and reinstall a shim pack, preferably an unused one, with less than four shims. On completion of either step S62 or S63 the routine will branch via step S64 to step S11, so that a new measurement on a soft foot condition may be carried out.

If the outcome of step S50 is in the negative, then the routine according to the inventive method branches to step S70. This branch relates to the condition that the two largest predicted soft foot conditions are predicted to be found either on the inboard side, the outboard side, or one of the sidelines of the machine under test. In step S70 the operator will therefore be prompted to loosen the mentioned two feet that are predicted to exhibit the largest soft foot conditions. The operator will also be prompted to measure the gaps of such feet to be tested, in a similar fashion as has been set out above. After step S70 will have been completed, step S80 will be encountered, in which a calculation and decision is performed very similar to that of step S61. If the answer is in the negative, then, similarly, the routine will branch to step S81, prompting the operator in the same way as in step S63. With step S63 completed, the routine will commence via step S82 to S11, so that a new standard prediction on a soft foot condition may be carried out, in order to check for any remaining corrective action.

If, alternatively, the outcome of step S80 is in the positive, then it will be decided in accordance with the present invention in step S90 if the two largest soft foot conditions are predicted to be on either end of the machine (ends of the machine relating to the ends of the main shaft of such a machine). If the answer is in the positive, the routine will branch to step S91, where it is signaled to the operator that the observed soft foot condition may be due to an induced effect. Such induced effect may relate to the fact that a coupling strain is possibly present, which may be confirmed by opening the coupling on the shaft of the machine under test, or by checking the alignment of the machine under test with regard to its counterpart.

If, on the other hand, the answer is in the negative, step S92 of the routine will be encountered. This step will display a message to the operator that the induced soft foot condition is very likely due to external strains. Therefore, the operator (for example, a millwright), may also receive a message to remove possible pipe strains and any other side loads that may be present on the machine under test.

With either steps S91 or S92 completed, the routine will proceed with step S93, which will branch to step S11 for entering a renewed, possibly final check on a soft foot condition on the machine under test.

Figures 5A, 5B:
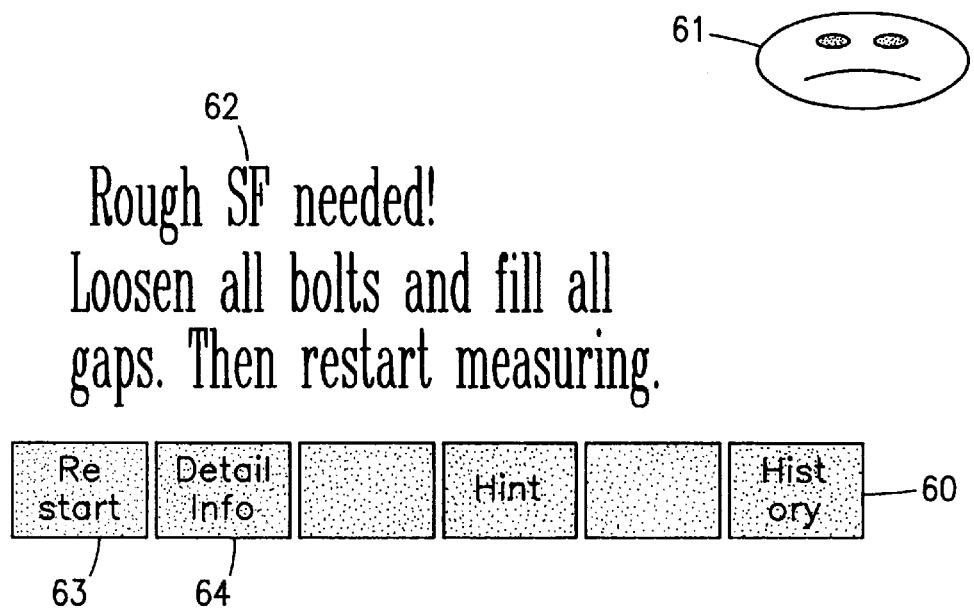
FIGS. 5A and 5B illustrate examples of the appearance of the display of the machine according to the invention, used for outputting information useful to the operator or for prompting the operator

An illustration of a displayed message and a softkey-menu 60 to choose from is depicted in FIG. 5A, which relates to Step S20. A text message 62 in plain language is displayed, which may be accompanied by an appropriate "grouchy" icon 62 (instead of a "smiley" icon). By activating key 63 the routine will be allowed to enter step S21, which will effectively transfer control to step S11 (Start). On activating key 64, it will be possible to display detailed information to the operator. Such detailed information may relate to the history of measurements recorded on the particular machine under test, for example pointing out that a soft-foot condition has been worked on before, and recalling former causes and remedies applied to correct such situation from the memory of the device according to the invention.

Another kind of display of detailed information may relate to the progress of work performed on one or several machines under test, as depicted in FIG. 5B. Display screen 80 for example will show by line 81, that a squishy foot condition existed with feet 2 and 3, as measured on the indicated date and time. Line 82 will reveal the further history of work performed on such machine, indicating for example the detection of a rough soft foot condition at a somewhat later point of time. Array 70 of softkeys may be activated manually by the operator, in order to proceed according to his intentions. For example, activating cursor keys 66, 67 will scroll the highlighted line, e.g. 81, 82. Furthermore, information on a highlighted or otherwise emphasized line of displayed screen 80 may be gained by pressing key 64. Activating key 65 may transfer control of the routine to a next step, as defined by the method of the invention and set out above, for example.

Although the invention has been described with reference to specific embodiments, various modifications of the disclosed embodiments as well as other embodiments of the invention will become apparent to persons skilled in the art on reference to the detailed description of the invention contained herein. Accordingly, the claims of the present application should not be limited to the specific preferred embodiments described.

We claim:

1. A method for diagnosing and correcting soft foot conditions on at least one piece of machinery, comprising the steps of:

providing at least one measuring device for measuring the alignment of at least two machines which are connected in a linear arrangement, said device having a memory for storing at least three alignment measurements of said at least two machines;

providing a computer means for calculating values related to the existence of a soft foot condition and for evaluating the existence of various types of soft conditions, and for determining appropriate corrective actions utilizing the alignment measurements stored in said measuring device and other inputted values;

measuring and storing in memory the alignment conditions of said at least two machines;

loosening a single foot of one of said at least two machines;

measuring the height of gaps at an outboard side of all of the feet of said one of said at least two machines;

inputting the heights of the gaps measured in the preceding step into said computer means;

operating the computer means to sequentially evaluate the existence of each of various types of soft conditions until a particular type of soft foot condition is determined to exist and then outputting from said computer means an indication of the type of soft foot determined and specific corrective actions to be implemented by the user for correcting the soft foot condition determined to exist.

2. The method according to claim 1, wherein the measuring, inputting and operating steps are repeated until none of said various types of soft foot conditions are determined to exist.

3. Apparatus for diagnosing and correcting soft foot conditions on at least one piece of machinery, comprising:

at least one measuring device for measuring the alignment of at least two machines which are connected in a linear arrangement, said device having a memory for storing at least three alignment measurements of said at least two machines;

a computer means for calculating values related to the existence of a soft foot condition and for evaluating the existence of various types of soft conditions, and for determining appropriate corrective actions utilizing the alignment measurements stored in said measuring device and other inputted values;

means for inputting the heights of the gaps measured at an outboard side of at least one of the feet of one of said at least two machines into said computer means;

wherein the computer means has processing means which sequentially evaluates the existence of each of various types of soft conditions until a particular type of soft foot condition is determined to exist and then outputs an indication of the type of soft foot determined and specific corrective actions to be implemented by the user for correcting the soft foot condition determined to exist.

4. Apparatus according to claim 2, wherein said inputting means comprises input keys and wherein a display means is provided for displaying the type of soft foot determined and the specific corrective actions to be implemented by the user.

* * * * *